ALBERT A. ELWOOD &
RONALD I. CARLSON

INVENTORS

BY Earnest Carl Edge

ALBERT A. ELWOOD &
RONALD I. CARLSON
INVENTORS

BY Earnest Carl Edge

United States Patent Office 3,327,142
Patented June 20, 1967

3,327,142
MAGNETIC MOUNTING FOR PIEZO-
ELECTRIC CRYSTALS
Albert A. Elwood, 3310 NE. 26th Ave. 33064, and
Ronald I. Carlson, 1710 NE. 2nd Terrace 33060,
both of Pompano Beach, Fla.
Filed Jan. 25, 1965, Ser. No. 427,866
6 Claims. (Cl. 310—9.1)

This invention relates to a mounting for piezoelectric crystals and the like in which magnetized elements are used for holding the crystals in the locations desired.

Throughout this specification and in the accompanying drawing the invention is described and shown as used in a crystal temperature probe but it may be utilized in any situation where it is desired that crystals be mounted so as to be relatively unaffected by the environmental structure.

It is the primary object of our invention to provide a mounting for crystals which will prevent the casing or mounting from affecting the frequency output of the crystal when the casing or mounting expands or contracts due to a change in the temperature.

It is well known in the art that a change in temperature will effect a change in the frequency output of a crystal, and it is also true that a change in the mounting area contacted by the crystal will affect the activity of the crystal. Further, a crystal which is mounted in such a manner as to be affected by any dimensional changes of the mounting will vary in frequency as the mounting varies dimensionally with temperautre. The reason for this is that a dimensional change will affect the pressure exerted on the crystal, and as the frequency is a function of pressure, any change of pressure will affect the frequency.

It is an object of our invention, therefore, to mount the crystal in such a manner that the contact with the metal of the mounting is minimal in area and is not fastened solidly thereto, thereby making the crystal free of any change in frequency output due to the physical characteristics or changes in physical characteristics of the mounting.

A further object of the invention is to provide an intimate thermal contact between the crystal and the mounting but to form the contact in such a manner that the crystal is not affected by dimensional changes of the mounting.

Another object of the invention is to provide a crystal mounting which is relatively simple in construction, easy to assemble, and practically free of maintenance problems.

Figure 1:
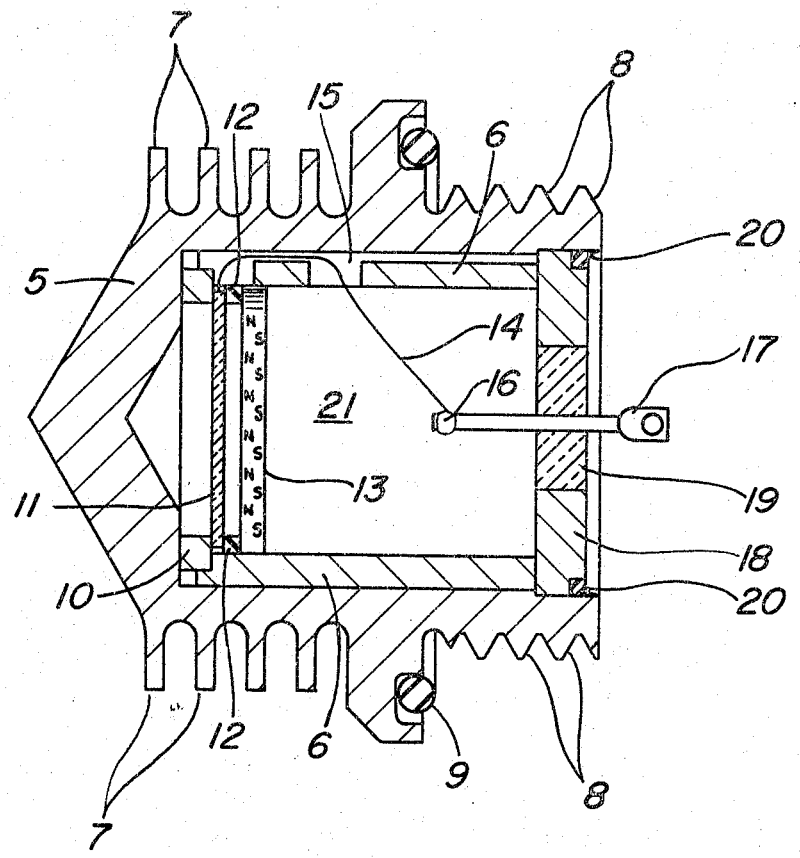
Figure 2:
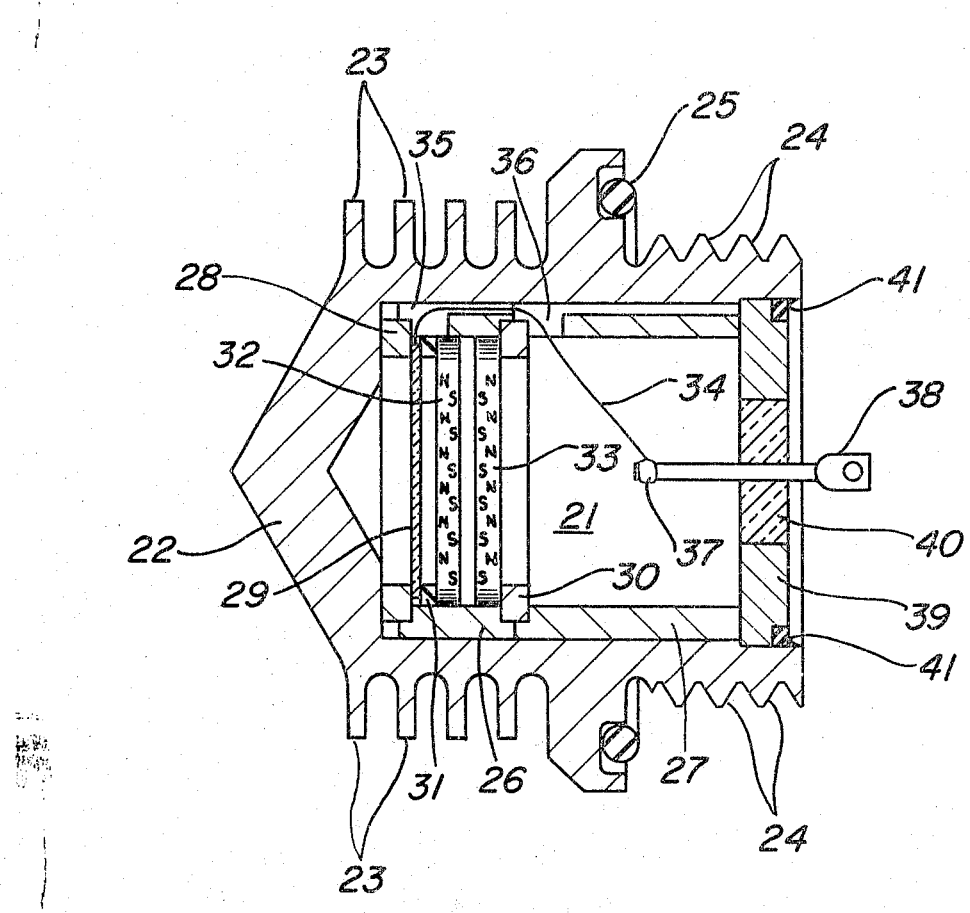

Further objects, advantages, and capabilities of our invention will be apparent from the following description taken in conjunction with the accompanying drawing wherein:

FIGURE 1 is a cross-sectional view of a temperature probe with a crystal mounted therein with a single magnet according to our invention; and FIGURE 2 is a cross-sectional view of a temperature probe with a plurality of magnets used to mount a crystal according to our invention.

Referring now to the drawing, the temperature probe has an outer casing 5 which is hollowed out to provide for the accommodation of a cylindrical member 6 therein. Casing 5 is also provided with fins 7 for providing a greater contact surface with the material being probed and screw threads 8 for attachment to a body portion for containment of other structure not related to our invention. An annular compressible seal 9 is shown for sealing the probe to the undisclosed body portion.

Mounted within the casing 5, near the forward end thereof and held in place by said casing 5 and cylindrical member 6 is annular ring 10 of magnetizable material. In order to function properly casing 5 and cylinder 6 must be made of non-magnetic material.

Crystal 11 is mounted against annular ring 10 and due to the fact that member 10 is an annular ring the actual contact between it and crystal 11 is only a small area at the outer edges of crystal 11.

On the opposite side of crystal 11 is spacer 12 which is also in the form of an annular ring. This spacer is made of a non-conducting material such as Teflon or rubber, for example, which does not expand or contract an amount sufficient to affect the degree of attraction between the magnet and the ring 10.

Magnet 13 is located adjacent to spacer 12 and is held in place by the magnetic attraction between it and magnetizable ring 10. As crystal 11 and spacer 12 are located between members 10 and 13, all of these members, 10, 11, 12, and 13, are held together as a unit due to the said magnetic attraction.

Lead 14 is connected to crystal 11 and passes through passage 15 provided in the cylindrical member 6 to be joined to feed-through connector 17 by means of soldered connection 16.

End 18 seals off the end of casing 5 and is provided with a central glass portion 19 through which feed-through connector 17 passes in an air-tight relationship. End 18 is joined to casing 5 by means of weld 20. It should be noted here that end 18 is also made of non-magnetic material.

The space 21 within the probe is filled with any suitable inert gas.

Thus it will be seen that crystal 11 is mounted within the temperature probe in such a manner that there is no permanent or solid connection between it and casing or ring 10 but is in contact with a small area of ring 10. Any expansion or contraction of casing 5 and ring 10 will not effect a change of pressure of crystal 11 which would affect the output frequency of the crystal. As member 13 is a permanent magnet it will remain in the position shown in FIGURE 1 due to the magnetic attraction between it and ring 10. Spacer 12 protects crystal 11 from being affected by any change in physical characteristics of magnet 13 due to temperature changes.

In the modification shown in FIGURE 2 a plurality of magnets are used to mount the crystal. Casing 22 is provided with fins 23 near the front end thereof and threads 24 at the opposite end. Compressible seal 25 is provided to seal the probe to an undisclosed body portion.

Instead of a single cylindrical member such as 6 in FIGURE 1, casing 22 encloses a cylindrical member 26 and a second cylindrical member 27 placed in an end-to-end relationship. Between member 26 and casing 22 is annular ring 28 against which crystal 29 fits. A second annular ring 30 is located rearwardly of ring 28 and is held in place in grooves provided therefor in members 26 and 27.

Adjacent to crystal 29 is spacer 31 made of non-conducting material such as Teflon or rubber. Magnets 32 and 33 are placed with like pole faces adjacent to each other with magnet 32 adjacent to spacer 31 and magnet 33 adjacent to annular member 30.

With like pole faces of the two magnets placed adjacent to each other the magnetic flux will cause them to repel each other and in so doing magnet 32 will, through spacer 31, hold crystal 29 firmly in place against member 28. Magnet 33 will be held firmly against ring 30.

In this modification of the invention all of the parts thereof are made of non-magnetic materials except the two magnets 32 and 33.

Lead 34 is attached to crystal 29 and passes through passage 35 in member 26 and passage 36 in member 27, said passages 35 and 36 being horizontal alignment. Lead 34 is attached to feed-through connector 38 by means of soldered end 37.

End 39 has a glass section 40 through which connector 38 passes. End 39 is also connected to casing 22 by means of welds 41.

Throughout this specification the word crystal has been used to indicate a temperature-responsive, frequency-determining device and is used for illustrative rather than limiting purposes. A routineer in the art may substitute any temperature-responsive, frequency-determining device for the crystal and still be within the area of invention covered herein.

While only two embodiments of our invention have been shown and described, it is understood that it is not intended to be exhaustive nor limiting of the invention, but on the contrary, is given for purposes of illustration in order that others skilled in the art may fully understand the invention and the principles thereof, and the manner of applying it in practical use so that they may modify and adapt it in various forms, each as may be best suited to the conditions of a particular use, and still be within the scope of my invention.

What is claimed is:
1. A mounting for a piezo-electric crystal comprising
   (a) a base member,
   (b) a crystal located adjacent said base member,
   (c) said base member being of such configuration that only the outer edges of said crystal are contacted thereby,
   (d) a magnetic member adjacent said crystal on the side of said crystal opposite said base member, and
   (e) a spacing member between said crystal and said magnetic member whereby said crystal is held at a contsant pressure by the magnetic force of said magnetic member and said base member.
2. A mounting for a piezo-electric crystal comprising
   (a) a base member,
   (b) a crystal located adjacent said base member,
   (c) said base member being of such configuration that only the outer edges of said crystal are contacted thereby,
   (d) a magnetic member adjacent said crystal on the side of said crystal opposite said base member,
   (e) a non-conducting spacing member between said crystal and said magnetic member, and
   (f) said spacing member shaped so that it touches said crystal and said magnet only at the outer edges thereof whereby said crystal is held at a constant pressure by said magnetic member and said base member.
3. A mounting for a piezo-electric crystal comprising
   (a) a base member of magnetic material,
   (b) a crystal located adjacent said base member,
   (c) said base member being shaped so that only the outer edges of said crystal are contacted thereby,
   (d) a magnetic member adjacent said crystal on the side of said crystal opposite said base member, and
   (e) a spacing member between said crystal and said second magnetic member whereby said crystal is held in position by the magnetic attraction of said magnetic member to said base member.
4. A mounting for a piezo-electric crystal comprising
   (a) a base member of magnetic material,
   (b) a crystal located adjacent said base member,
   (c) said base member being of such configuration that only the outer edges of said crystal are contacted thereby,
   (d) a magnetic member adjacent said crystal on the side of said crystal opposite said base member,
   (e) a non-conducting spacing member between said crystal and said magnetic member, and
   (f) said spacing member shaped so that it touches said crystal and said magnetic member only at the outer edges thereof whereby said crystal is magnetically held in place at a constant force.
5. A mounting for a piezo-electric crystal comprising
   (a) a base member of non-magnetic material,
   (b) a crystal located adjacent said base member,
   (c) said base member being shaped so that only the outer edges of said crytsal are contacted thereby,
   (d) a first magnetic member adjacent said crystal on the side of said crystal opposite said base member,
   (e) a spacing member between said crystal and said magnetic member,
   (f) a second magnetic member adjacent said first magnetic member,
   (g) said magnetic members placed with like pole faces adjacent to each other, and
   (h) a second non-magnetic base member for holding said second magnetic member in position whereby said crystal is held in position at a constant force by said first and second magnetic members.
6. A mounting for a piezo-electric crystal comprising
   (a) an outer non-magnetic casing member,
   (b) a base member of non-magnetic material held by said casing member,
   (c) a crystal located adjacent said base member,
   (d) said base member being shaped so that only the outer edges of said crystal are contacted thereby,
   (e) a first magnetic member adjacent said crystal on the side of said crystal opposite said base member,
   (f) a spacing member between said crystal and said magnetic member,
   (g) a second magnetic member adjacent said first magnetic member,
   (h) said magnetic members placed with like pole faces adjacent to each other,
   (i) a second non-magnetic base member for holding said second magnetic member in position, and
   (j) said second non-magnetic base member held by said casing member whereby said crystal is maintained in position by said magnetic members at a constant pressure.

References Cited

UNITED STATES PATENTS

| | | | |
|---|---|---|---|
| 2,278,966 | 4/1942 | Williams | 310—9.1 |
| 2,435,548 | 2/1948 | Rosenthal | 310—8.8 |
| 2,542,651 | 2/1951 | Franklin | 310—9.3 |
| 2,677,775 | 5/1954 | Font | 310—8.9 |

FOREIGN PATENTS 488,564    7/1938    Great Britain.

MILTON O. HIRSHFIELD, *Primary Examiner.*

J. D. MILLER, *Assistant Examiner.*